United States Patent
Li et al.

(10) Patent No.: US 9,965,871 B1
(45) Date of Patent: May 8, 2018

(54) MULTI-BINARIZATION IMAGE PROCESSING

(71) Applicant: KONICA MINOLTA LABORATORY U.S.A., INC., San Mateo, CA (US)

(72) Inventors: Bo Li, Stanford, CA (US); Gang Fang, San Diego, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 0 days. days.

(21) Appl. No.: 15/396,116

(22) Filed: Dec. 30, 2016

(51) Int. Cl.
*G06K 9/00* (2006.01)
*G06T 7/90* (2017.01)
*G06T 5/40* (2006.01)

(52) U.S. Cl.
CPC ............... *G06T 7/90* (2017.01); *G06T 5/40* (2013.01); *G06T 2207/10024* (2013.01)

(58) Field of Classification Search
CPC combination set(s) only.
See application file for complete search history.

(56) References Cited

U.S. PATENT DOCUMENTS

| | | | |
|---|---|---|---|
| 6,798,906 B1* | 9/2004 | Kato | G06K 9/4609 345/468 |
| 8,351,699 B2 | 1/2013 | Li et al. | |
| 9,367,899 B1 | 6/2016 | Fang | |
| 2009/0196508 A1* | 8/2009 | Sullender | G06K 9/4638 382/201 |
| 2014/0093122 A1* | 4/2014 | Rabinowitz | G06T 1/0021 382/100 |
| 2015/0339816 A1* | 11/2015 | Yu | G01N 33/576 382/128 |
| 2016/0239981 A1* | 8/2016 | Tunali | G06K 9/4642 |

* cited by examiner

*Primary Examiner* — Alex Liew
(74) *Attorney, Agent, or Firm* — Squire Patton Boggs (US) LLP

(57) ABSTRACT

An image encoded with character information can be created by binarizing an input image followed by connected component labeling, and then repeating the binarization and connected component labeling on an inverted version of the input image. This results in identification of connected components. Related connected components are arranged in a family tree in which successive generations of the connected components alternate between two tree layer classifications. One of the tree layer classifications is selected based on whether certain connected components define characters. A label image is created which includes labels for the connected components except for the connected components in the selected tree layer classification.

24 Claims, 16 Drawing Sheets connected component labeling process

MULTI-BINARIZATION IMAGE PROCESSING

FIELD

This disclosure relates generally to image processing and, more particularly, to image analysis to create an image encoded with character information.

BACKGROUND

Document processing often involves binarization followed by connected component labeling to detect characters, embedded images, and other objects in a page image of a document. Binarization methods include global binarization and local binarization. Global binarization may cause some characters to go undetected during connected component labeling. This may occur when characters in the page image vary in appearance due to differences in color, intensity, and background. Local binarization can be performed instead to increase detection of characters, but local binarization can be inefficient. Local binarization often requires a significantly higher amount of computing resources and time compared to global binarization. There is a continuing need for an accurate and efficient way to detect characters in an input image.

SUMMARY

Briefly and in general terms, the present invention is directed to an image analysis method, apparatus, and non-transitory computer readable medium for creating an image encoded with character information.

In aspects of the invention, an image analysis method comprises binarizing an input image to create a first binary image, detecting a first plurality of connected components in the first binary image, inverting the input image to create an inverted image, binarizing the inverted image to create a second binary image, detecting a second plurality of connected components in the second binary image, creating a combined label image including labels for the first plurality of connected components and the second plurality of connected components, and analyzing the combined label image to arrange, in a family tree, the first plurality of connected components and the second plurality of connected components. The family tree has a first layer classification and a second layer classification, and successive generations of the connected components alternate between the first layer classification and the second layer classification. The method also comprises selecting a tree layer classification from among the first layer classification and the second layer classification. The selecting is performed by a processor based at least on whether one or more of the connected components in the family tree define characters. The method also comprises creating a modified label image by removing, from the combined label image, the labels for the connected components in the selected tree layer classification.

In aspects of the invention, an apparatus comprises a processor and a memory device in communication with the processor. The memory stores instructions and the processor is configured to create an image encoded with character information by performing a process according to the stored instructions. The process performed by the processor comprises binarizing an input image to create a first binary image, detecting a first plurality of connected components in the first binary image, inverting the input image to create an inverted image, binarizing the inverted image to create a second binary image, detecting a second plurality of connected components in the second binary image, creating a combined label image including labels for the first plurality of connected components and the second plurality of connected components, and analyzing the combined label image to arrange, in a family tree, the first plurality of connected components and the second plurality of connected components. The family tree has a first layer classification and a second layer classification, and successive generations of the connected components alternate between the first layer classification and the second layer classification. The process performed by the processor also comprises selecting a tree layer classification from among the first layer classification and the second layer classification. The selecting is based at least on whether one or more of the connected components in the family tree define characters. The process performed by the processor also comprises creating a modified label image by removing, from the combined label image, the labels for the connected components in the selected tree layer classification.

In aspects of the invention, a non-transitory computer-readable medium has stored thereon computer readable instructions that, when executed by a processor of an apparatus, cause the apparatus to perform a process for creating an image encoded with character information. The process performed by the apparatus comprises binarizing an input image to create a first binary image, detecting a first plurality of connected components in the first binary image, inverting the input image to create an inverted image, binarizing the inverted image to create a second binary image, detecting a second plurality of connected components in the second binary image, creating a combined label image including labels for the first plurality of connected components and the second plurality of connected components, and analyzing the combined label image to arrange, in a family tree, the first plurality of connected components and the second plurality of connected components. The family tree has a first layer classification and a second layer classification, and successive generations of the connected components alternate between the first layer classification and the second layer classification. The process performed by the apparatus also comprises selecting a tree layer classification from among the first layer classification and the second layer classification. The selecting is based at least on whether one or more of the connected components in the family tree define characters. The process performed by the apparatus also comprises creating a modified label image by removing, from the combined label image, the labels for the connected components in the selected tree layer classification.

The features and advantages of the invention will be more readily understood from the following detailed description which should be read in conjunction with the accompanying drawings.

DETAILED DESCRIPTION

As used herein, the term "image" encompasses any one or a combination of photographs, pictures, illustrations, characters, and other objects. For example, an image can be a scan of a page from a book or handwritten document.

As used herein, the term "characters" refers to characters that can be alphanumeric, phonetic, semantic, and the like. The term encompasses mathematical symbols. The term encompasses Japanese characters, Chinese characters, Arabic characters, and other characters used in written language.

As used herein, the term "embedded image" encompasses illustrations, photographs, and the like. For example, an input image can be a scanned page or a portion of a scanned page from a book or other document, and the input image may include lines of text and embedded images. The embedded images are embedded in the sense that they form a part of the input image. The characters in the text may surround the embedded images. Alternatively, the input image may have embedded images with no characters surrounding the embedded images. As a further example, an embedded image may be a photograph of a street scene with automobiles and street signs, so the embedded image may also show characters in the street signs.

As used herein, a grayscale image is an image in which each one of all pixels in the image has one of several values representing intensity information. For example, a grayscale image can be an image in which pixels are white, black, or one of various shades of gray between white and black. Each pixel is represented by a grayscale value ranging from a minimum value often representing black (lowest intensity) to a maximum value often representing white (highest intensity). The minimum value can be 0, and the maximum value can be 16, 255, or other number. Values between the minimum and maximum values represent various shades of gray.

As used herein, a binary image is a bi-tonal image in which each one of all pixels in the image has one of only two available values. For example, a binary image can be a black and white image in which pixels have one of two available values, namely a value corresponding to white and a value corresponding to black.

Figure 1:
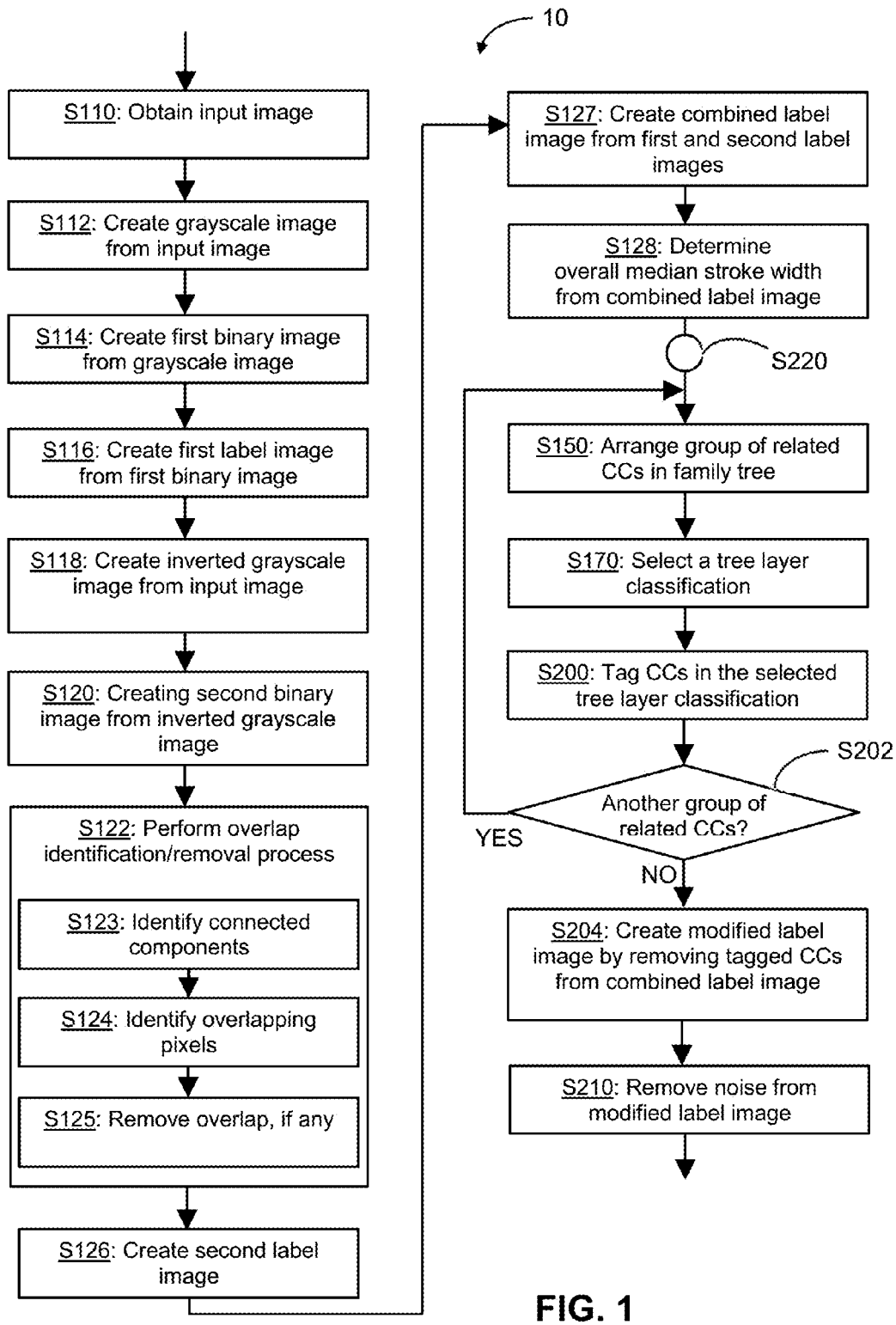
FIG. 1 is a flow diagram showing an example method for analyzing an input image using at least two binarizations.

Referring now in more detail to the example drawings for purposes of illustrating aspects of the invention, wherein like reference numerals designate corresponding or like elements among the several views, there is shown in FIG. 1 example method 10 for analyzing an image.

Figure 2:
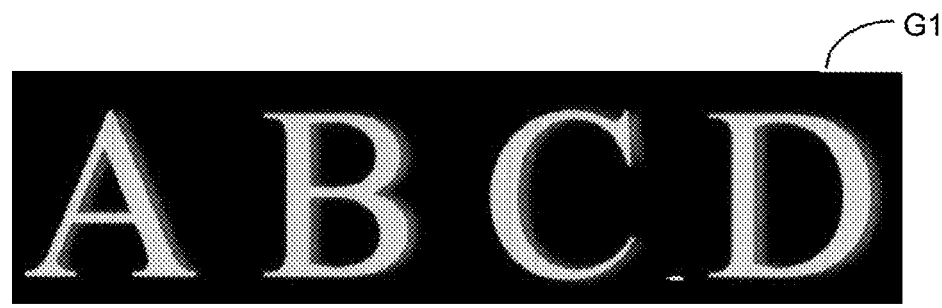
FIG. 2 shows an example first grayscale image of an input image.

At block S110, an input image is obtained. The input image can be a grayscale image or a color image. For example, a color image can be an RGB image in which each pixel is presented by a combination of red, green, and blue with each color having its own intensity. If the input image is a color image, a color-to-grayscale conversion process is applied to the color image at block S112 to convert the color image to a grayscale image. The color-to-grayscale conversion process may apply weighting to various colors in the color image to obtain corresponding grayscale values for the grayscale image. Suitable color-to-grayscale conversion algorithms are known in the art. If the input image is a grayscale image, then block S112 can be skipped. Example grayscale image G1 is shown in FIG. 2.

Figure 3:
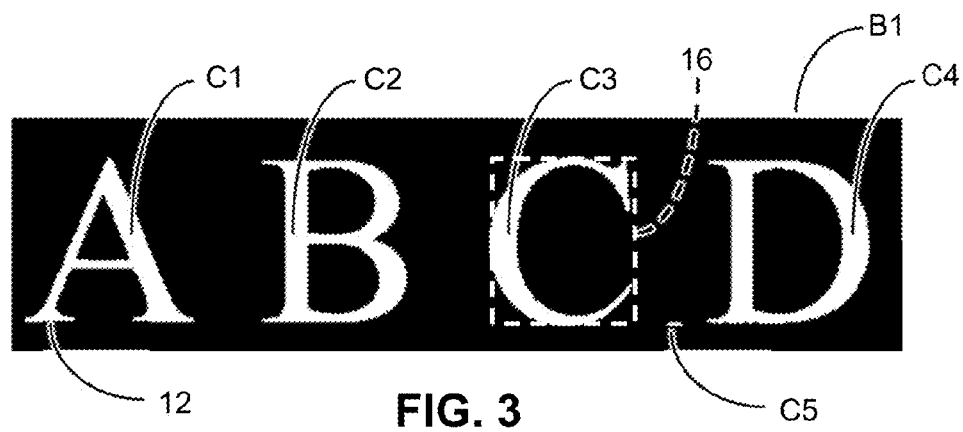
FIG. 3 shows an example first binary image of the first grayscale image.

At block S114, a first binarization process is applied to grayscale image G1 to create a first binary image. G1 is considered to be the input image for the first binarization process. Example first binary image B1 is shown in FIG. 3. The first binarization process includes selecting a binarization threshold value, and then comparing the grayscale value of each pixel of the grayscale image to the binarization threshold value to determine a binary value (e.g., black or white) to be assigned to that pixel. Algorithms for selecting a binarization threshold value attempt to identify an optimal value that balances the need to preserve information likely to be of interest and to discard information unlikely to be of interest such as background noise.

As used herein the terms "binarization threshold value" and "binarization threshold" have the same meaning and are used interchangeably.

For example, a grayscale value GV can be in the range of 0 to 255, with 0 representing black and 255 representing white. For example, a binarization threshold may be selected to be equal to 139 such that pixels having GV less than 139 will be assigned a binary value corresponding to black, and pixels having GV greater than or equal to 139 will be assigned a binary value corresponding to white.

The first binarization process at block S114 is a global binarization process. As used herein, a "global binarization process" is a process in which the algorithm for selecting a binarization threshold selects a single binarization threshold T to be used for the entire grayscale image in creating first binary image B1. The grayscale values of pixels in all portions of the grayscale image are compared to the same binarization threshold T.

A global binarization process is different from a local binarization process in which an image is divided into multiple image portions, and a local binarization threshold is determined individually for each image portion such that the local binarization threshold for one image portion may differ from the local binarization threshold for another image portion. In a local binarization process, for example, a local binarization threshold may be selected for use in a first image portion, and a different local binarization threshold may be selected for use in a second image portion that is brighter or darker than the first image portion. This enables a local binarization process to be accurate in preserving information likely to be of interest.

In a global binarization process, a single binarization threshold is selected by a binarization algorithm for use in all portions of the grayscale image. As compared to conventional local binarization processes, a global binarization process will typically require much less computing resources and time. A potential drawback is that a single global binarization process may be unable to preserve most or all information likely to be of interest. Performing a series of at least two binarization processes, as described herein, could help address this issue without the increased computing resources and time associated with conventional local binarization processes.

Suitable algorithms for selecting a binarization threshold T, such as the Otsu and Newton methods and variations thereof, are known in the art. Also, the grayscale image can be binarized multiple times using different threshold values, and for each binarization, statistics on useful information and noise are calculated. The statistics are used to finally select T from among the different threshold values that were used. The selected value for T is used create first binary image B1.

Referring again to FIG. 1, block S116 performs a connected component labeling process on first binary image B1. The connected component labeling process detects connected pixels in the binary image. Two pixels are connected if they touch and also have the same binary value. Touching can be determined under 4-way connectivity (sides touching) or 8-way connectivity (sides or corners touching). A group of pixels that are connected to each other is referred to as a connected component (CC). The connected component labeling process at block S116 may detect several, hundreds, or thousands of connected components in the binary image. A connected component can define a character, an embedded image, or other type of object in the binary image. Suitable algorithms for connected component labeling processes are known in the art.

FIG. 3 shows example connected components detected in first binary image B1. There are five connected components, namely C1 to C5, which correspond to the connected white pixels. C1 to C4 correspond to the connected white pixels in the letters A, B, C, and D respectively. C5 corresponds to connected white pixels of a stray mark or noise. In this example, the connected component labeling algorithm has identified connected white (or high intensity) pixels, although it is possible to use instead a connected component labeling algorithm that identifies connected black (or low intensity) pixels.

The connected component labeling process also maintains an accounting of the detected connected components by generating a label image in which each pixel is associated with a connected component. A label image is one in which a unique label or number is assigned to each connected component, and the assigned numbers are the pixel values of the connected components.

Figure 4:
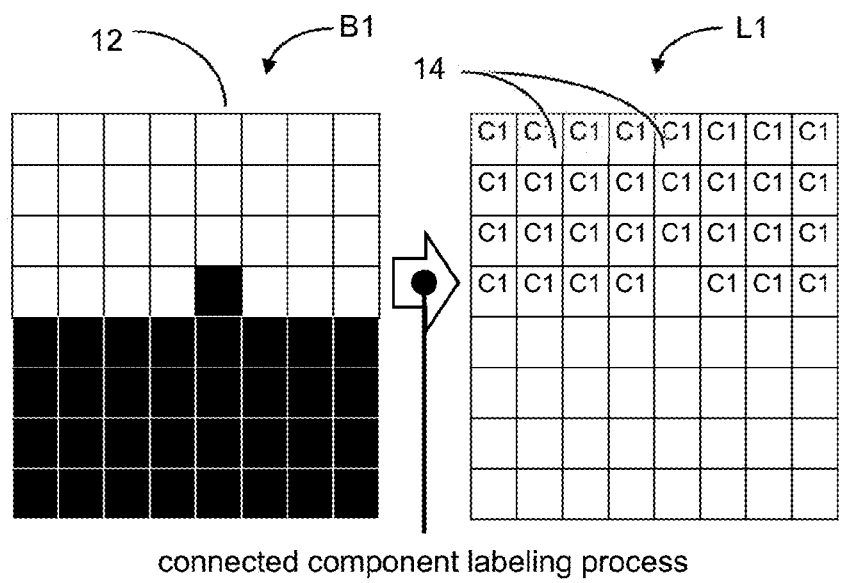
FIG. 4 illustrates an example connected component labeling process performed on the first binary image.

FIG. 4 shows an enlarged portion of example first label image L1 corresponding to region 12 at the bottom of the letter A in first binary image B1. In FIG. 4, pixels 14 at a bottom portion of the letter A are labeled C1 for ease of discussion, although the label may be any number assigned specifically to connected component C1.

The connected component labeling process at block S116 and at other process blocks herein may also include obtaining a bounding box and an area of each of the connected components detected in the binary image.

The bounding box of a connected component is the smallest rectangle that contains the connected component. Thus, a bounding box provides a measure of size of the connected component contained within it. Example bounding box 16 is shown for connected component C3 in FIG. 3. Bounding box 16 defines the extent of connected component C3. The size of any bounding box depends on the outer edges of its connected component. The height and width of the bounding box for one connected component may differ from the height and width of the bounding box for another connected component.

The area of a connected component is the total number of pixels of that connected component. For example, the area of connected component of C1 is the total number of pixels labeled C1 in first label image L1.

Figure 5:
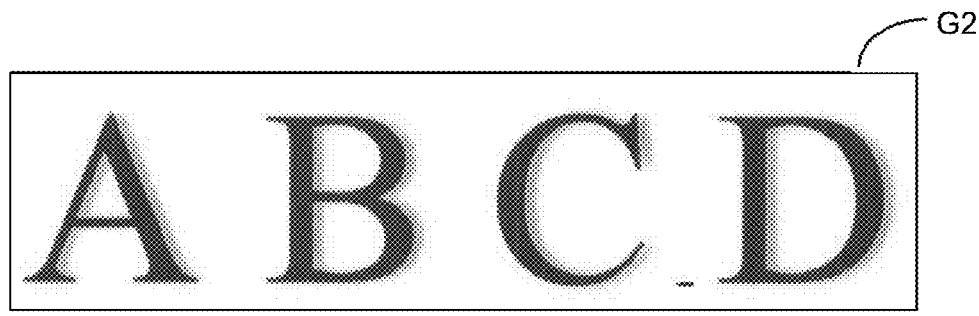
FIG. 5 shows an example second grayscale image that is a negative of the first grayscale image.

Referring again to FIG. 1, block S118 inverts grayscale image G1 to form an inverted grayscale image. In general, block S118 inverts the input that was used in the first binarization at block S114. FIG. 5 shows example inverted grayscale image G2 of G1. The inversion process performed at block S118 makes white and black pixels in G1 into black and white pixels, respectively, in G2. Pixels having darker shades of gray in G1 correspond to pixels having lighter shades of gray in G2. The result is that G2 is a negative of G1. Suitable algorithms for inverting an image to create a negative are known in the art.

Figure 6:
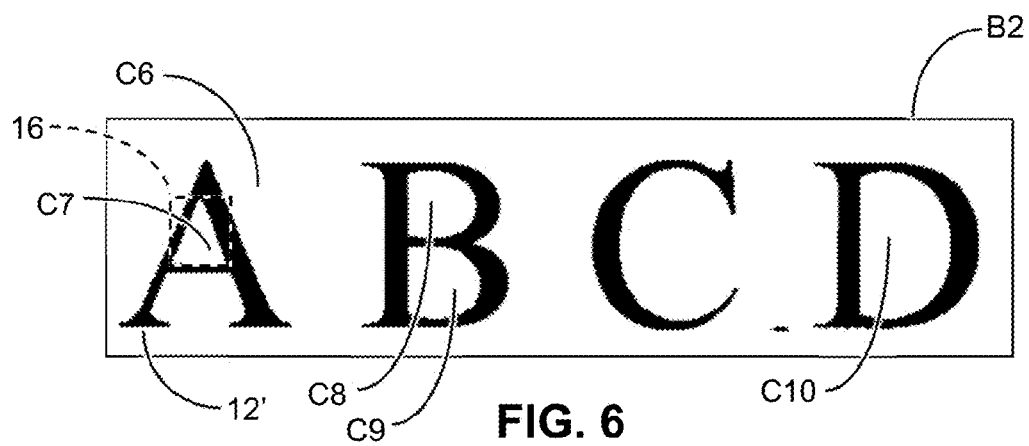
FIG. 6 shows an example second binary image of the second grayscale image.

Block S120 applies a binarization process to inverted grayscale image G2 to create a second binary image. The process is referred to as a second binarization process to distinguish from the prior binarization process at block S114. Example second binary image B2 is shown in FIG. 6. The second binarization process at block S120 may be as described for the first binarization process. Both the first and second binarization processes are global binarization processes.

At block S122, an overlap identification/removal process is performed to check for and then remove portions of connected components in second binary image B2 which overlap with connected components of first binary image B1. In general, block S122 identifies overlaps in the connected components detected in one of the binary images versus the connected components detected in another one of the binary images. The overlap identification/removal process includes identifying (block S123) connected components of B2, comparing pixels of the connected components of B2 to those of B1 to identify (block S124) any overlapping pixels, and if any overlapping pixels are identified, then modifying (block S125) either the first or second binary image to eliminate the overlap.

FIG. 6 shows connected components in second binary image B2 identified at block S123. There are five example connected components, namely C6 to C10, which correspond to the connected white pixels in the background that surrounds the letters and that are contained within the letters.

In this example, the connected component labeling algorithm has identified connected white pixels, as was done in the connected component labeling process of block S116.

Figure 7:
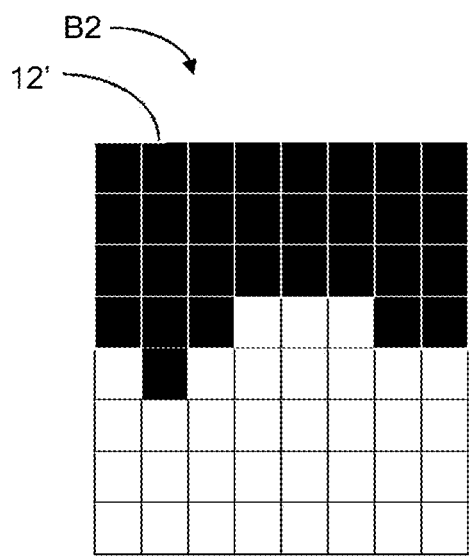
FIG. 7 shows a magnified portion of the second binary image.

FIG. 7 shows an enlarged portion of region 12' at the bottom of the letter A in second binary image B2. Region 12' (FIGS. 6 and 7) is at the same location as region 12 (FIGS. 3 and 4).

Figure 8:
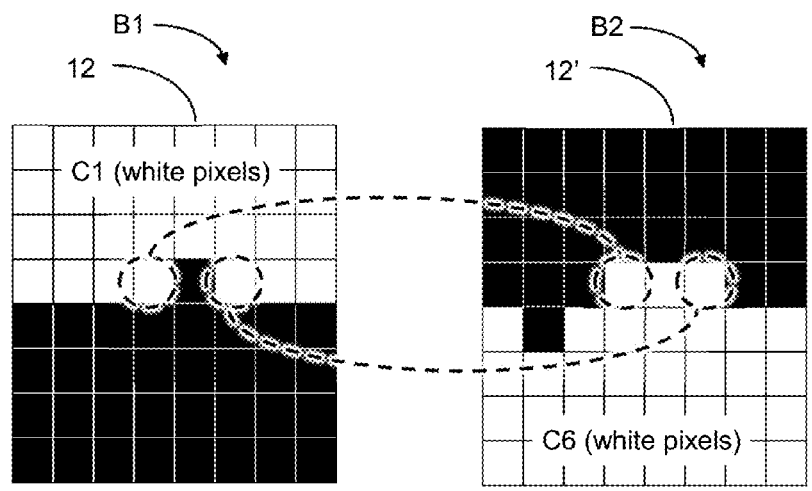
FIG. 8 illustrates an example process for identifying overlapping pixels of the first and second binary images.

FIG. 8 illustrates comparing pixels of the connected components of second binary image B2 to those of first binary image B1 to identify (block S124) overlapping pixels. FIG. 8 is a partial illustration in that it shows only the pixels corresponding to region 12 of B1 and the pixels corresponding to region 12' of B2. Recall that connected components of the examples of FIGS. 3 and 6 comprise connected white pixels.

Overlapping connected component pixels are the connected component pixels that occupy corresponding locations in B1 and B2. The broken line circles in FIG. 8 identify the overlapping connected component pixels.

Figure 9:
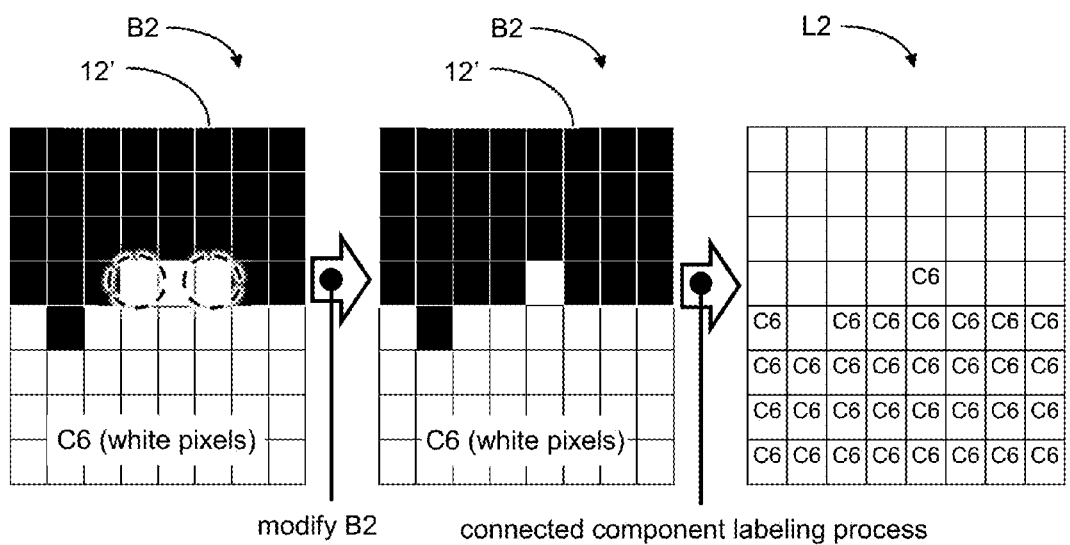
FIG. 9 illustrates an example process for removing overlaps and an example process for connected component labeling performed on the second binary image.

FIG. 9 illustrates modifying second binary image B2 to remove (block S125) the overlap of FIG. 8. Overlapping connected component pixels indicated by broken line circles are removed from B2. It is to be understood that all overlaps are removed from B2 at block S125. However, if there was no overlap identified at block S124, then the modification of B2 is not performed.

Referring again to FIG. 1, after the overlap identification/removal process is completed, block S126 performs a connected component labeling process on second binary image B2 to create second label image L2, as shown in FIG. 9. The connected component labeling process determines bounding boxes and areas of connected components C6 to C10. Example bounding box 16 is shown in FIG. 6 for connected component C7 contained within letter A. If an overlap was removed at block S125, then the connected component labeling process is performed on the modified second binary image. If there was no overlap removed at block S125, then the connected component labeling process is performed on the original second binary image.

Figure 10:
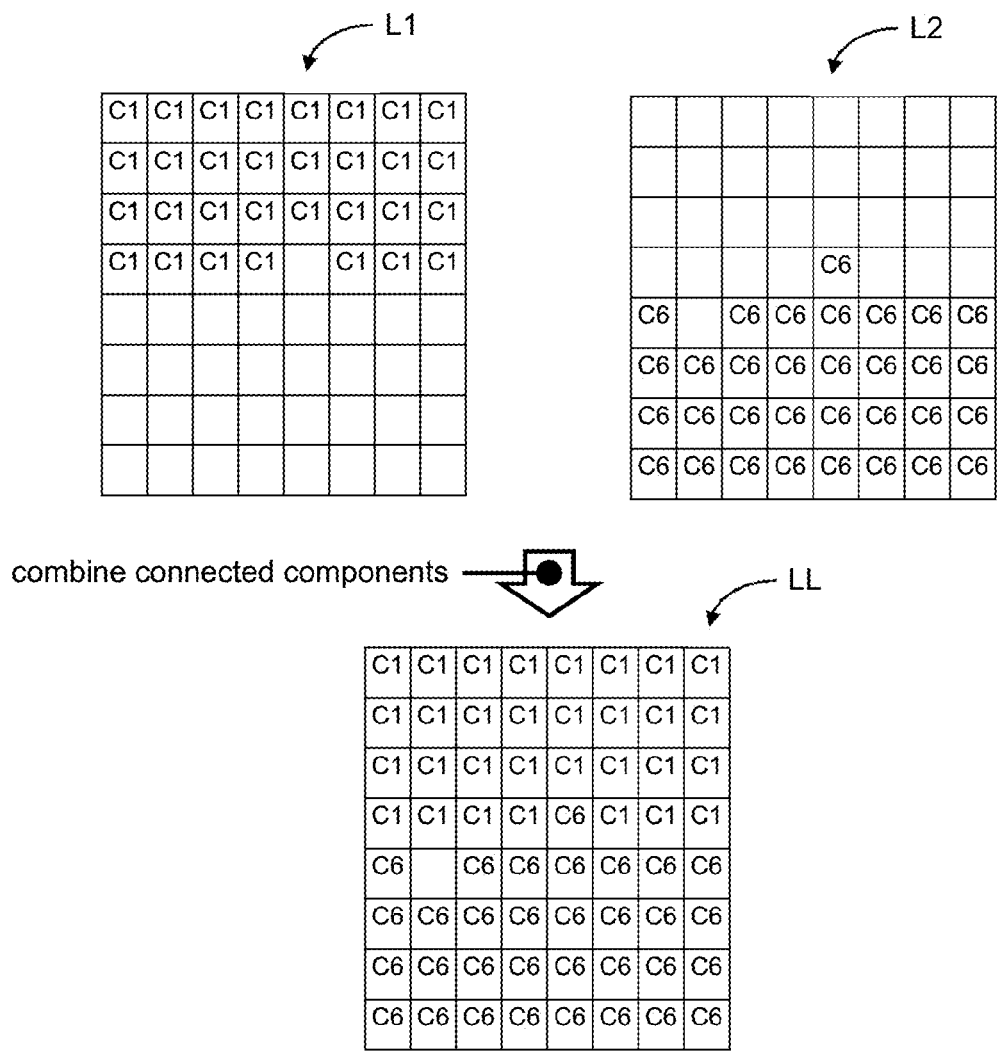
FIG. 10 illustrates an example process for combining connected components to form a combined label image.

Block S127 creates combined label image LL that contains labels for all connected components detected in first binary image B1 and second binary image B2. FIG. 10 shows a portion of example combined label image LL corresponding to regions 12 and 12' at the bottom of the letter A.

At block S128, an overall median stroke width is determined for combined label image LL. The overall median stroke width can be used later at blocks S172 (FIG. 17) and S198 (FIG. 18).

Figure 11:
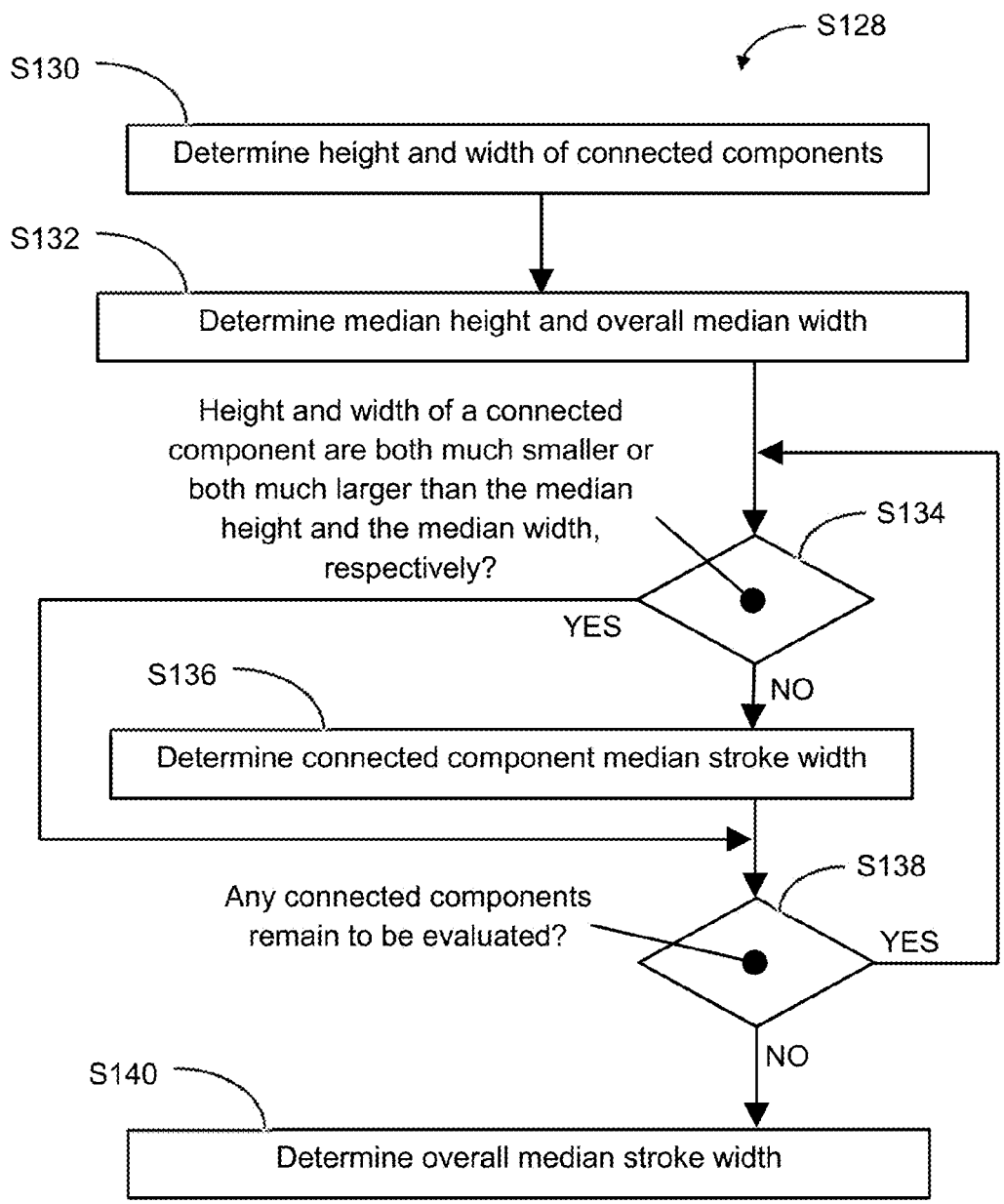
FIG. 11 is a flow diagram showing an example process for determining an overall median stoke width of connected components.

FIG. 11 shows an example subprocess for block S128 to determine the overall median stroke width. At block S130, a height and a width are determined for all connected components (C1 to C10) individually. The height and width can be determined to be the same as the height and width of the bounding box for the connected component. At block S132, a median height is calculated from all the heights determined from block S130, and a median width is calculated from all the widths determined from block S130. The term "median" refers to the middle value in an ordered array of values For example, the median value for the ordered array {1,2,5,99,200} is 5.

At block S134, each connected component is evaluated against the median height and width. Block S134 determines whether the height and width of the connected component are both much smaller or both much larger than the median height and median width, respectively. In this context, "much smaller" means that the value being evaluated (either the height or width of the connected component) is below a low threshold percentage of the median value (either the median height or median width, respectively). The low threshold percentage can be, for example, 20%, 10% or lower. Also, "much larger" means that the value being evaluated (either the height or width of the connected component) is above a high threshold percentage of the median value (either the median height or median width, respectively). The high threshold percentage can be, for example, 150%, 200% or higher.

If the result of block S134 is YES, then the process proceeds to block S138, otherwise the process proceeds to block S136. Block S134 serves the function of identifying connected components that define embedded images and other objects that are unlikely to be entirely characters, and then excluding them from a subsequent calculation of overall median stroke width at block S140.

At block S136, a stroke width is determined for various segments of the connected component, and a connected component stroke width is determined. The stroke width for a particular segment of a connected component can be defined as the largest diameter that can fit within that particular segment. For example, the largest diameter that can fit in the horizontal segment of connected component C1 (letter A in FIG. 3) will be smaller than the largest diameter that can fit in the right-side angled segment of connected component C1. The connected component stroke width can be based on the stroke widths of the various segments of the connected component. For example, the connected component stroke width can be the median or the average of the stroke widths of the various segments of the connected component. Suitable stroke width determination algorithms are known in the art.

Block S138 determines whether there is any connected component that remains to be evaluated according to block S134. If a connected component remains to be evaluated, the subprocess returns to block S134 to evaluate the remaining connected component, otherwise the subprocess proceeds to block S140.

Block S140 determines an overall median stroke width defined by connected components labeled in combined label image LL. The overall median stroke width is determined from all connected component stroke widths determined from block S136. Completion of block S140 may mark the end of the subprocess for block S128.

Referring again to FIG. 1, method 10 may skip block S220 (described later as containing a third binarization) and proceeds from block S128 to block S150. Block S150 analyzes combined label image LL so that each group of related connected components in LL are arranged in a family tree. Two connected components are related if one of them contains the other. For example, connected component C1 (the letter A in FIG. 3) contains and is related to connected component C7 (the background triangle within the letter A). In general, there can more than one group of related connected components, and the groups are arranged in separate family trees.

Figure 12:
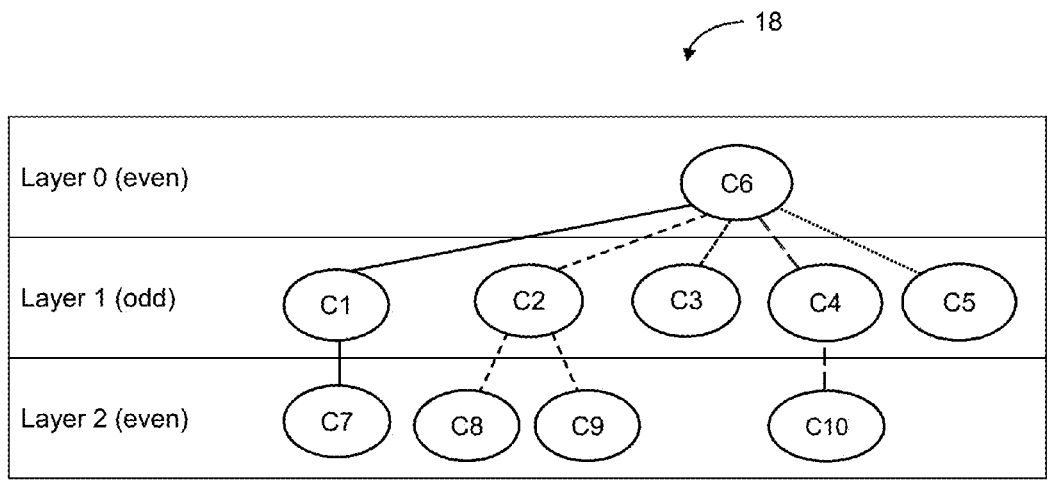
FIGS. 12 and 13 are schematic diagrams showing example family trees of relationships between connected components.

FIG. 12 shows example family tree 18 of one group of related connected components labeled in combined label image LL. In this example, connected components C1 to C10 form a single group of related connected components since one of the connected components, namely C6, contains all the other connected components. There would be two separate family trees if instead C6 contained C1 and C2 but not C3 to C5, and another connected component contained C3 to C5.

The connected components (specifically, the parent-child relationships of the connected components) are arranged in family tree 18. Each connected component is presented symbolically in family tree 18. The shapes or pixels of the connected components are not actually placed in a family tree structure.

In FIG. 12, C6 can be referred to as a top node, which is a connected component having no parent. A parent is a connected component that contains another connected component referred to as a child. C6 has no parent since it is not contained within another connected component.

Family tree 18 includes successive generations of related connected components. The first generation consists of connected component C6, the top node, and is located in tree layer 0. The second generation is located in tree layer 1. The second generation includes the children of C6, which are connected components C1 to C5 since they are all contained within C6. The third generation is located in tree layer 2. The third generation includes the children of the second generation, namely connected components C7 to C10 corresponding to connected white pixels contained within C1, C2, and C4.

Figure 13:
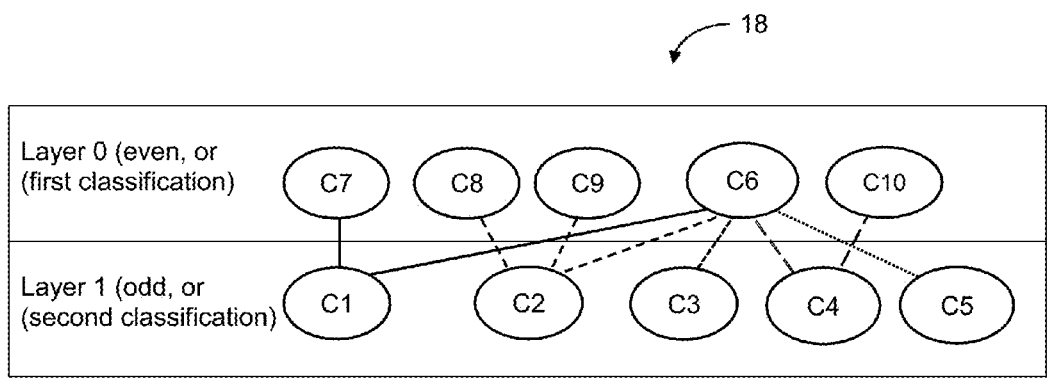

In FIG. 12, successive generations of connected components alternate between two tree layer classifications. The first generation is even (layer 0), the second generation is odd (layer 1), and the third generation goes back to even (layer 2). This alternating arrangement of successive generations between the two tree layer classifications (even and odd) would continue if there are more generations. A fourth generation would be odd (layer 3), a fifth generation would be even (layer 4), and so on. Family tree 18 may be organized in other ways. FIG. 13 shows another example family tree 18 showing the same parent-child relationships as in FIG. 12.

The terms "tree layer classification," "layer classification," and "classification" have the same meaning and are used interchangeably.

In FIG. 13, there are only two tree layers. Successive generations alternate between two classifications in that the first generation is even (layer 0), the second generation is odd (layer 1), and the third generation goes back to even (layer 0). This alternating arrangement of successive generations between the two classifications (even and odd) would continue if there are more generations. A fourth generation would be odd (layer 1), a fifth generation would be even (layer 0), and so on.

Family trees 18 in FIGS. 12 and 13 are similar in that each connected component is arranged in one of only two classifications, and successive generations starting from the top node alternate between the two classifications. The terminology for classifications in the above examples is odd versus even. Other terminology may be used, such as 0 versus 1, and top versus bottom. In general, successive generations alternate between a first classification and a second classification.

As will be discussed below, labels for connected components will be removed from combined layer image LL based on a selected tree layer classification. If the first classification is selected, then labels for all connected components in the first, third, fifth, etc. generations will be removed. If second classification is selected, then labels for all connected components in the second, fourth, sixth, etc. generations will be removed.

Figure 14:
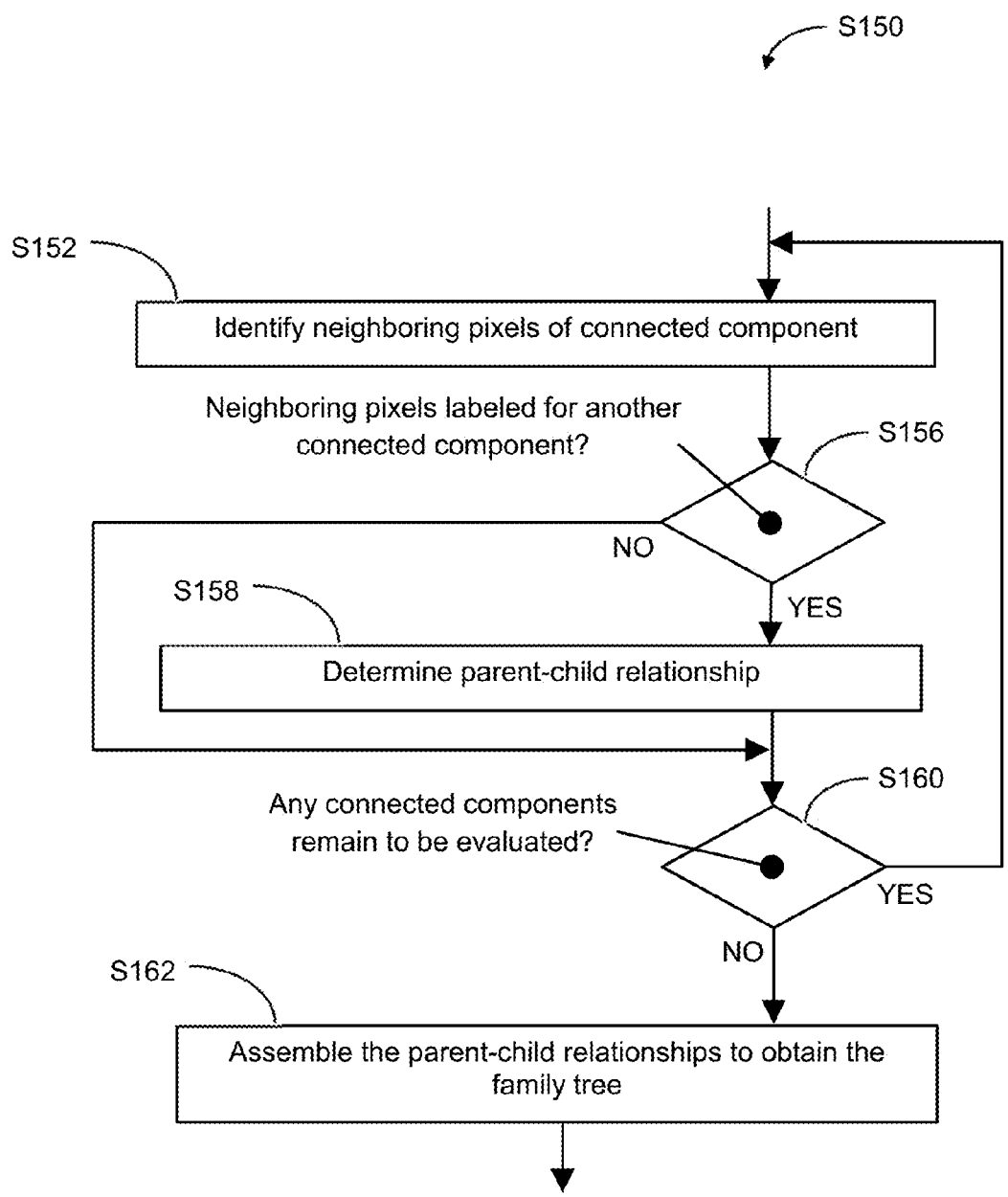
FIG. 14 is a flow diagram showing an example process for organizing a family tree.

FIG. 14 shows an example subprocess for block S150 to obtain a family tree for related connected components. At blocks S152 to S158, each connected components is evaluated to determine its parent-child relationship with another connected component.

At block S152, neighboring pixels of the connected component are identified. A neighboring pixel is a pixel that touches at least one pixel of the connected component. At block S156, there is a connected component being evaluated, which can be generically referred to as CN. Block S156 determines whether CN has any neighboring pixel that is labeled for another connected component. This can be accomplished by referring to combined label image LL. If CN has a neighboring pixel that is labeled for another connected component (block S156: YES), then the subprocess proceeds to block S158, otherwise the subprocess proceeds to block S160. At block S158, we have a connected component CN having a neighboring pixel labeled for another connected component, which can be generically referred to as CX. Block S158 determines a parent-child relationship between connected components CN and CX based on the bounding boxes of CN and CX.

The parent-child relationship can be based whether one of the bounding boxes is contained entirely within the other bounding box. If the bounding box of CN is contained entirely within the bounding box of CX, then CX is the parent and CN is the child. If the bounding box of CX is contained entirely within the bounding box of CN, then CN is the parent and CX is the child.

Alternatively, the parent-child relationship can be based on the size of bounding boxes. The size S of the bounding box can be based on the height H and width W of the bounding box. For example, the formula $S = H \times W$ or other formula can be used. If the bounding box size of CN is larger than the bounding box size of CX, then CN is the parent and CX is the child. If the bounding box of CX is larger than the bounding box of CN, then CX is the parent and CN is the child For example, when C1 is being evaluated, block S152 identifies the neighboring pixels of C1 (see letter A in FIG. 3). Block S156 recognizes that the neighboring pixels are labeled C6 and C7 (see FIG. 6). Block S158 determines that the bounding box of C1 is fully contained within the bounding box of C6, so C6 is the parent and C1 is its child. This parent-child relationship can be represented as a list: C6-C1. Block S158 also determines that the bounding box of C7 is fully contained within the bounding box of C1, so C1 is the parent and C7 is its child. This parent-child relationship can be represented as a list: C1-C7

Block S160 determines whether there is any connected component that remains to be evaluated according to block S152. If a connected component remains to be evaluated, the subprocess returns to block S152 to evaluate the remaining connected component, otherwise the subprocess proceeds to block S162.

When there is no connected component that remains to be evaluated, the subprocess proceeds to block S162. Block S162 assembles the parent-child relationships to arrange the connected components in family tree 18. Assembling includes combining lists to form combined lists, and then merging the combined lists to form the family tree. For example the list C6-C1 can be combined with the list C1-C7 to form a combined list C6-C1-C7. From the example of FIGS. 3 and 6, additional lists and combined lists will be C6-C2-C8, C6-C2-C9, C6-C3, C6-C4-C10, and C6-C5. The lists are merged together such that each connected component appears only once in the family tree, as shown in FIGS. 12 and 13.

From the foregoing description of the subprocess for block S150, it should be understood that family tree 18 can be obtained by analyzing the combined label image (blocks S152-S156) to obtain a parent-child relationship (block S158) for each one of the connected components (block S160), and then assembling the parent-child relationships (block S162) to create the family tree. Completion of block S162 may mark the end of the subprocess for block S150.

Figure 15:
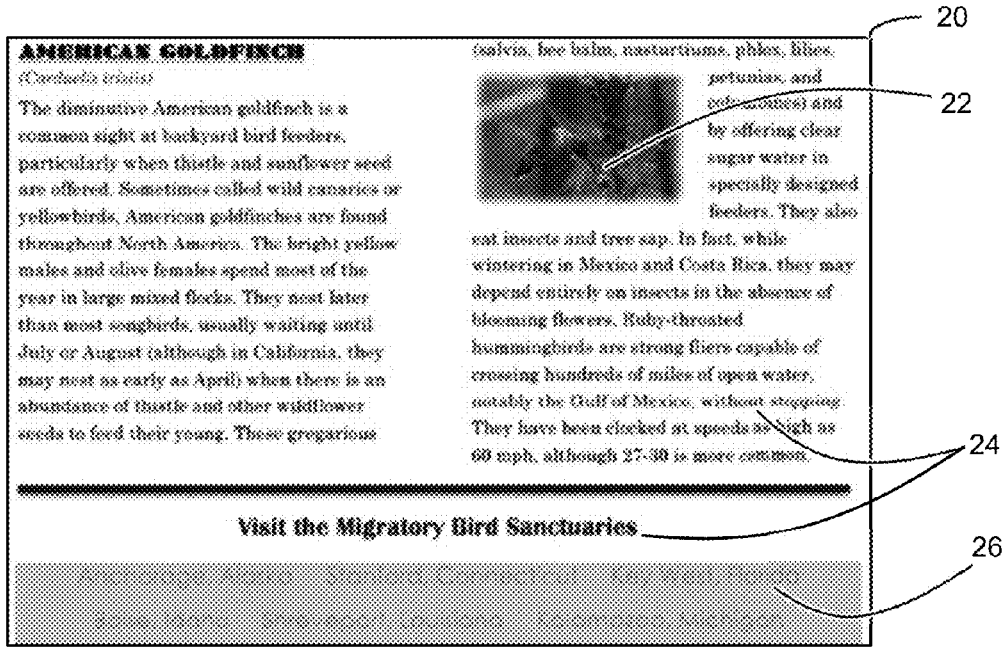
FIG. 15 shows an example input image.

Referring again to FIG. 1, method 10 proceeds from block S150 to block S170. Block S170 selects a tree layer classification from among the first classification and second classification. In some aspects, block S170 may serve the function of filtering out connected components that define objects that are not of interest, such as the background of characters. The selection of the tree layer classification is based on analysis of at least one of the connected components arranged in the family tree to determine whether the connected component defines a character. Selection may be complicated when an input image is a combination of foreground objects, such as characters, embedded images, noise, and others, as shown in FIG. 15. In such cases, connected components will define the various foreground objects and the background.

In FIG. 15, example input image 20 appears as a grayscale image although it may instead be a color image. Input image 20 includes embedded image 22 and various types of characters 24 and 26. The characters may have different contrasts relative to background as well as different font styles and sizes.

Figure 16:
FIG. 16 shows an example first grayscale image of the input image.

As shown in FIG. 16, input image 20 may be inverted before block S114 (FIG. 1) so that characters appear light in first grayscale G1. G1 is considered to be the input image for the first binarization at block S114. The second binarization at block S120 will use G2, which is the negative of G1.

Figure 17:
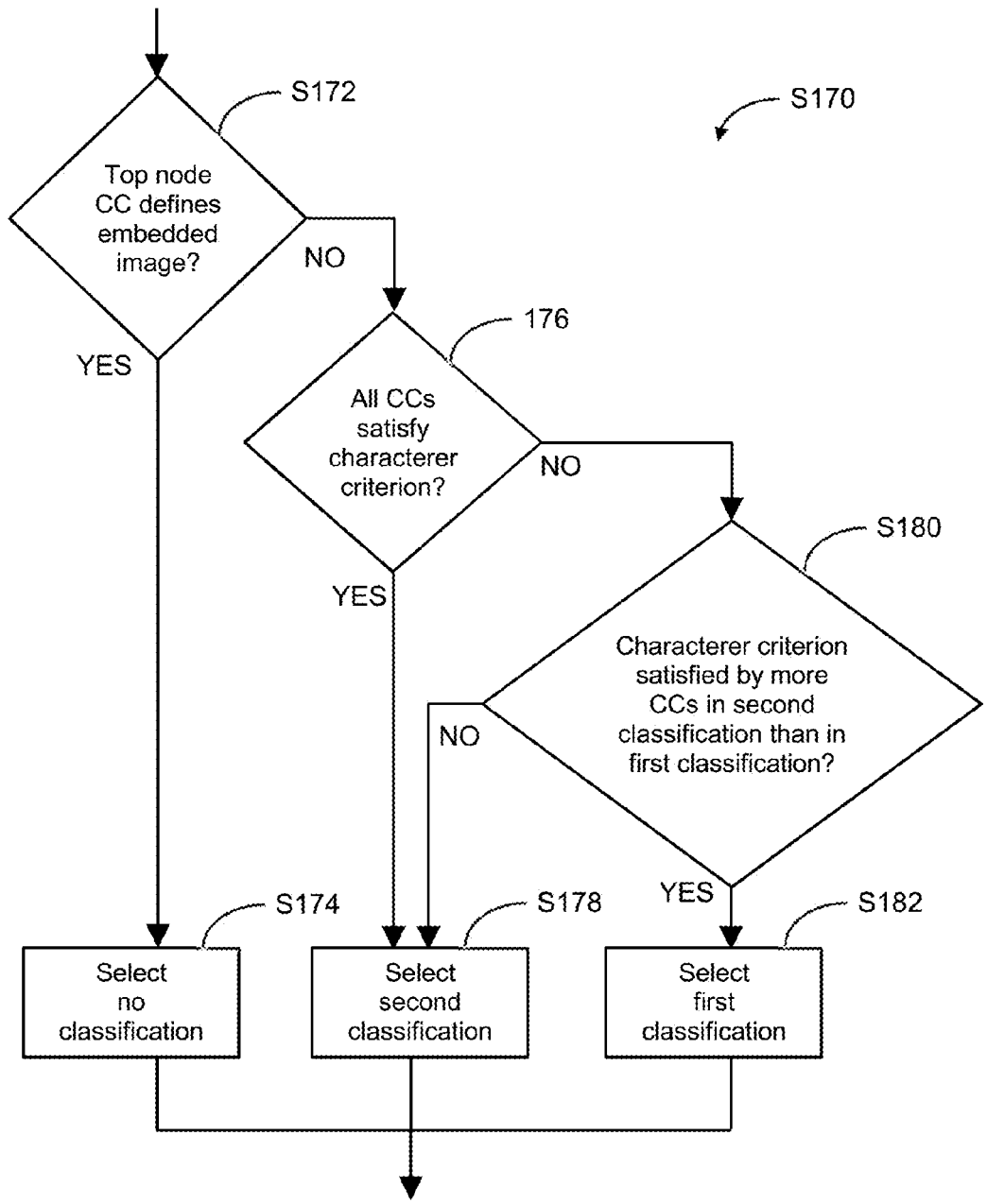
FIG. 17 is a flow diagram showing an example process for selecting a tree layer classification from the family tree.
Figure 18:
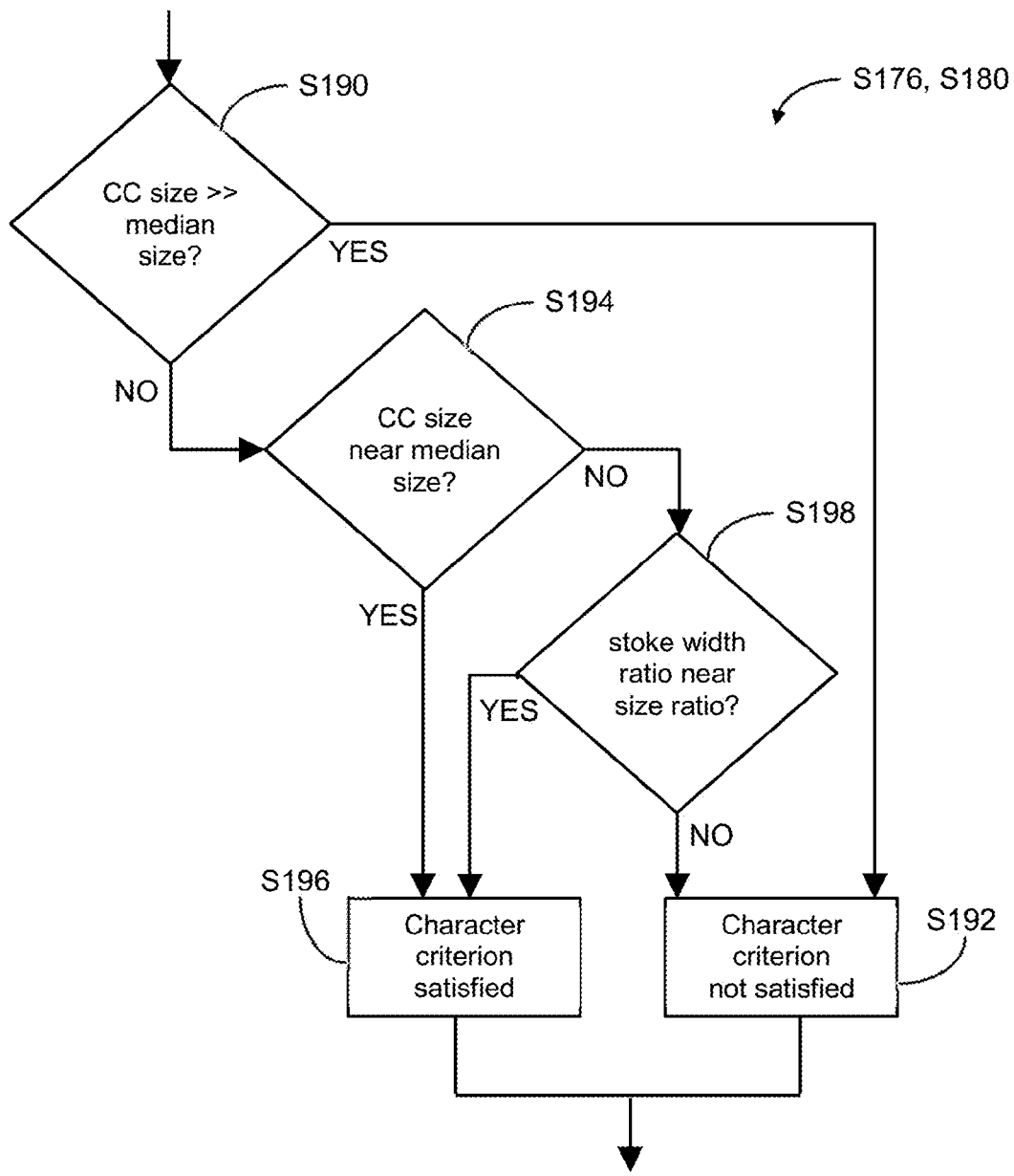
FIG. 18 is a flow diagram showing an example process for determining whether a connected component defines a character when selecting a tree layer classification.

FIG. 17 shows an example subprocess for block S170 (FIG. 1) to select a tree layer classification. Block S172 determines whether the top node connected component defines an embedded image (or likely defines an embedded image) based on filling rate of the connected component or stroke width. The top node connected component is determined to be an embedded image when (a) its area is high relative to its bounding box, and (b) its stroke width is high relative to the overall median stroke width. For example, the area of the connected component is high relative to its bounding box when the area fills at least 80% of the bounding box. Another filling percentage can be used. For example, the connected component stroke width is high relative to the overall median stroke width when the connected component stroke width is at least 50% of the overall median stroke width. Another stroke width percentage can be used. If either criteria (a) or (b) is not satisfied, it can be concluded that the top node connected component does not define an embedded image (S172: NO). Alternatively, if either criteria (a) or (b) is not satisfied, then additional criteria may be used at block S172 to determine whether the top node connected component defines an embedded image. Additional criteria could be any of those described below for blocks S213:YES and S215:NO in FIG. 19.

If the end result of block S172 is YES, then no tree layer classification is selected for removal (block S174). This is done because it is deemed likely that the top node connected component defines an embedded image and all connected component children of the top node define portions of the embedded image. When no classification is selected, no connected component labels will be removed from combined label image LL later at block S204 (FIG. 1). If the end result of block S172 is NO, the process proceeds to block S176.

Block S176 determines whether all connected components in the family three satisfy a character criterion. The character criterion includes comparing the size of the connected component to the median size, as will be described below in connection with FIG. 18. If the result of block S176 is YES, then the second classification is selected (block S178). Thus, labels for connected components in the second classification will be removed later at block S204 (FIG. 1). Labels for connected components in the first classification will remain since it is deemed likely that connected components in the first classification define characters rather than the background. If the result of block S176 is NO, the process proceeds to block S180.

Block S180 determines whether the character criterion is satisfied by a greater number connected components in the second classification than in the first classification. If the result of block S180 is YES, then the first classification is selected (block S182). Thus, labels for connected components in the first classification will be removed later at block S204 (FIG. 1). Labels for connected components in the second classification will remain since it is deemed likely that connected components in the second classification define characters rather than the background, noise, or other type of object. If the result of block S180 is NO, then the second classification is selected (block S178).

FIG. 18 shows an example subprocess to determine whether the character criterion is satisfied at blocks S176 and S180 in FIG. 17. Block S190 determines whether the size of the connected component (CC size) is much greater than the median size of connected components in the family tree. The size S of any connected component can be based on the height H and width W of its bounding box. For example, the formula S=H×W or other formula can be used. If the result of block S190 is YES, then the character criterion is not satisfied (block S192). If the result of block S190 is NO, the subprocess proceeds to block S194.

Block S194 determines whether the connected component size (CC size) is near the median size. In this context, "near" means that the CC size is between a low threshold fraction and a high threshold fraction of the median size. For example, the low and high threshold fractions could be 0.8 and 1.2 so that the CC size is determined to be near the median size M if the CC size is between 0.8×M and 1.2×M. Other threshold fractions could be used. If the result of block S194 is YES, then the character criterion is satisfied (block S196). If the result of block S194 is NO, the subprocess proceeds to block S198.

Block S198 determines whether the connected component has a stroke width ratio near its size ratio. Block S198 serves the function of checking whether the connected component defines a character of a large font size. The stroke width of the connected component (CC stroke width) is compared to the overall median stroke width. The stroke width ratio R1 can be CC stroke width/overall median stroke width. The size ratio R2 can be CC size/median size. The stroke width ratio R1 is near size ratio R2 when R1 is between a low threshold fraction and a high threshold fraction of R2. For example, the low and high threshold fractions could be 0.8 and 1.2 so that R1 is determined to be near R2 if the R1 is between 0.8×R2 and 1.2×R2. Other threshold fractions could be used. If the result of block S198 is YES, then the character criterion is satisfied (block S196), as the connected component defines (or likely defines) a character of a large font size. If the result of block S198 is NO, then the character criterion is not satisfied (block S192).

FIGS. 17 and 18 illustrate example subprocesses for selecting a tree layer classification at block S170 in FIG. 1. After block S170, method 10 proceeds to block S200.

Referring again to FIG. 1, block S200 tags the connected components in the selected tree layer classification for later removal from combined image label LL. For example, tagging may include storing in memory the identity of those connected components. As previously mentioned, labels for connected components will be removed from combined layer image LL based on the selected tree layer classification. If the first classification was selected at block S170, then labels for all connected components in the first, third, fifth, etc. generations will be removed later at block S204. If the second classification was selected at block S170, then labels for all connected components in the second, fourth, sixth, etc. generations will be removed later at block S204.

At block S202, it is determined whether there is another group of related connected components to be arranged in a family tree. As previously mentioned, there can more than one group of related connected components labeled in combined label image LL, and the groups would be arranged in separate family trees. For example, there would be two family trees if instead top node C6 contained C1 and C2 but not C3 to C5, and another top node contained C3 to C5. If the result of block S202 is YES, then method 10 returns to block S150 so that the next group of related connected components can be arranged in a family tree. If the result of block S202 is NO, then method 10 proceeds to block S204.

At block S204, connected components that were tagged in S200 are removed from combined label image LL. In the example of FIGS. 3 and 6, the first tree layer classification will be selected since top node C6 is not an embedded image (S172: NO), all connected components do not satisfy the character criterion (S176: NO), and a greater number of the connected components in the second classification satisfy the character criterion than in the first classification (S180: YES). FIGS. 12 and 13 show connected components C6 to C10 in the first classification, thus C6 to C10 will be tagged for removal at block S200. At block S204, labels for C6 to C10 will be removed from combined label image LL, which leaves labels for C1 to C5 in combined label image LL. The remaining labels represent character information encoded in LL.

After block S204, block S210 removes from combined label image LL the labels of connected components that correspond to noise. Connected component C5 (FIG. 3) corresponds to noise. Noise can be in the form of specks and other extraneous artifacts. Noise can arise from paper texture, equipment for optical scanning, or other causes. Suitable noise removal algorithms are known in the art. The noise removal algorithms may include morphological opening and closing operations that are repeatedly performed on combined label image LL. Embedded images are excluded from areas of combined label image LL that will be subjected to noise removal algorithms so that the embedded images are not altered.

At block S210, characteristics of each of connected components are analyzed to determine whether the connected component defines an embedded image so that the embedded image will not be subjected to noise removal. An example subprocess for block S210 is shown in FIG. 19.

Figure 19:
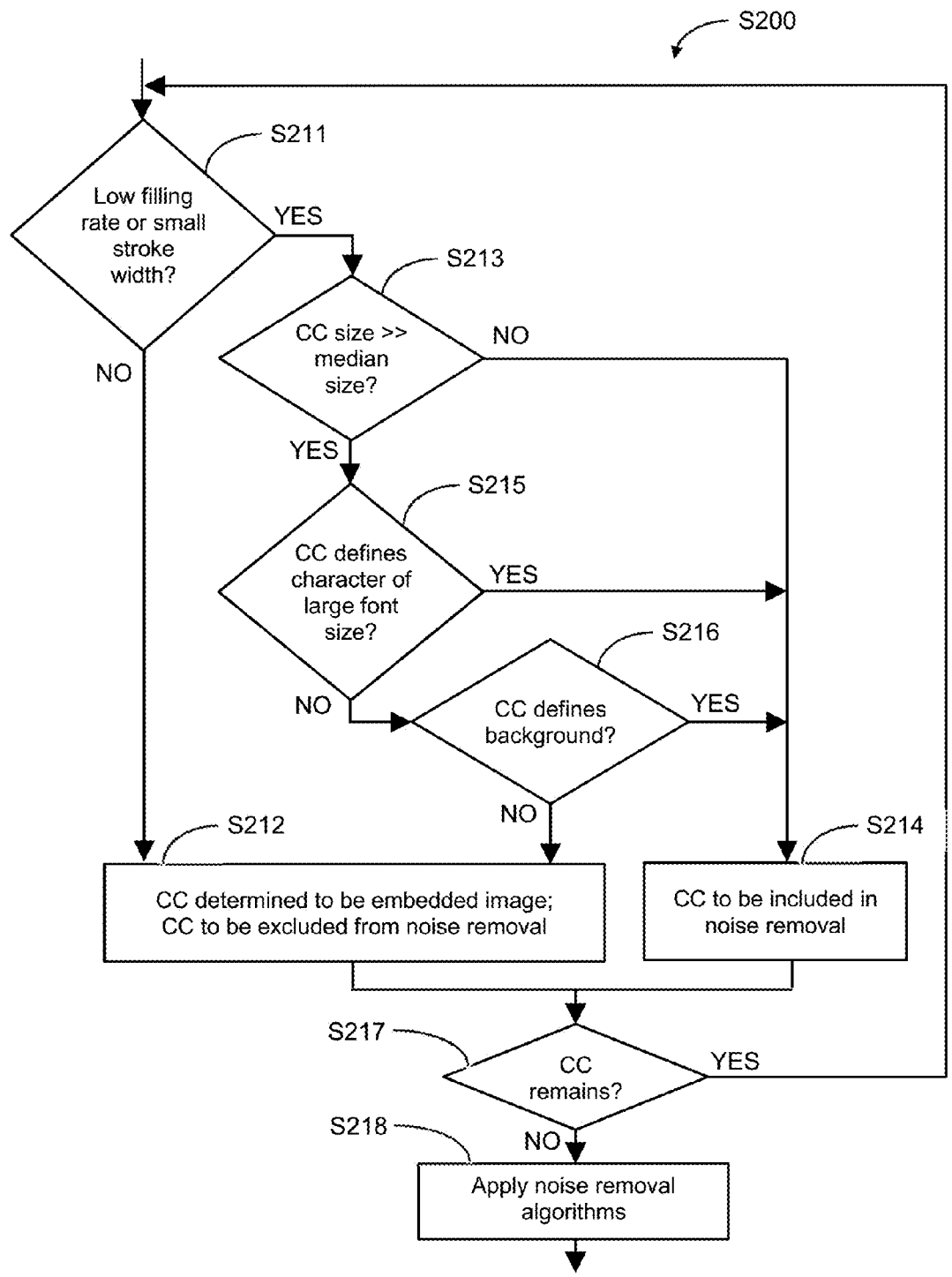
FIG. 19 is a flow diagram showing an example process for determining whether a connected component defines an embedded image to be excluded from noise removal.

Referring to FIG. 19, block S211 determines whether the connected component defines an embedded image based on filling rate of the connected component or stroke width. For example, it is determined that the connected component is not an embedded image (block S211: YES) when either (a) the area of the connected component is low relative to the size of the bounding box of the connected component, or (b) the connected component stroke width (CC stroke width) is low relative to the overall median stroke width. For example, the area of the connected component is low relative to its bounding box when the area fills less than 20% of the bounding box. Another filling percentage can be used. For example, the CC stroke width is low relative to the overall median stroke width when the CC stroke width is less than 30% of the overall median stroke width. Another stroke width percentage can be used.

If the result of block S211 is NO, then the connected component is excluded from noise removal algorithms (block S212). The connected component is excluded in that the pixels of combined label image LL contained within the connected component bounding box will not be subjected to the noise removal algorithms. If the result of block S211 is YES, the subprocess proceeds to block S213.

Block S213 determines whether the connected component size (CC size) is much larger than the median size. For example, it is determined that the CC size is much larger than the median size when the CC size is larger than a percentage of the median size. The percentage can be 200%, 400%, or greater. If the result of block S213 is NO, the connected component is not an embedded image, so the connected component will not be excluded from the areas of combined label image LL to be subjected to noise removal algorithms (block S214). If the result of block S213 is YES, the subprocess proceeds to block S215.

Block S215 determines whether the connected component defines a character of a large font size. This determination can be based on stroke width ratios and size ratios, as previously described for block S198. If the result of block S215 is YES, then the connected component will form areas of combined label image LL to be subjected to noise removal algorithms (block S214). If the result of block S215 is NO, then the subprocess proceeds to block S216.

Block S216 determines whether the connected component defines background. For example, any one or a combination of the following criteria can be used: (a) at least 80% (first threshold percentage) of grayscale values in G1 or G2 corresponding to the connected component are within a range of 10% (first range percentage) of each other; (b) at least 80% (second threshold percentage) of hue values in the original input image corresponding to the connected component are within a range of 10% (second range percentage) of each other; and (c) a length of edges of the connected component is greater than the connected component size. Other threshold percentages and range percentages can be used. The length of edges of the connected component can be computed using a Canny edge detection algorithm or other algorithm known in the art. Criteria (a) may apply to a case in which the original input image (before converting to grayscale) is a color image.

The connected component defines background when one, two, or all of criteria (a), (b), and (c) are satisfied. If the result of block S216 is YES, then the connected component is not excluded (block S214). If the result of block S216 is NO, then the connected component is excluded (block S212).

Next, block S217 determines whether there is another connected component represented in combined label image LL that remains to be evaluated according to block S211. If another connected component remains, the subprocess returns to block S211 to evaluate the remaining connected component. If the result of block S217 is NO, the subprocess proceeds to block S218.

Block S218 applies noise removal algorithms to combined label image LL except the areas of LL within the bounding boxes of connected components excluded at block S212. In the example of FIG. 3, connected component C5 has a high filling rate (S211: YES) and does not have a size much greater than the median size (block S213: NO), so C5 will not be excluded. At block S218, areas of LL corresponding to C5 are subjected to noise removal. Noise removal may result in complete or partial removal of labels for C5 from LL. The remaining labels represent character information encoded in LL.

Greater accuracy, without the increased computing resources and time associated with conventional local binarization processes, could be achieved in some circumstances by performing another global binarization process. A third binarization process can be performed at block S220 in FIG. 1. An example subprocess for block S220 is shown in FIG. 20.

Figure 20:
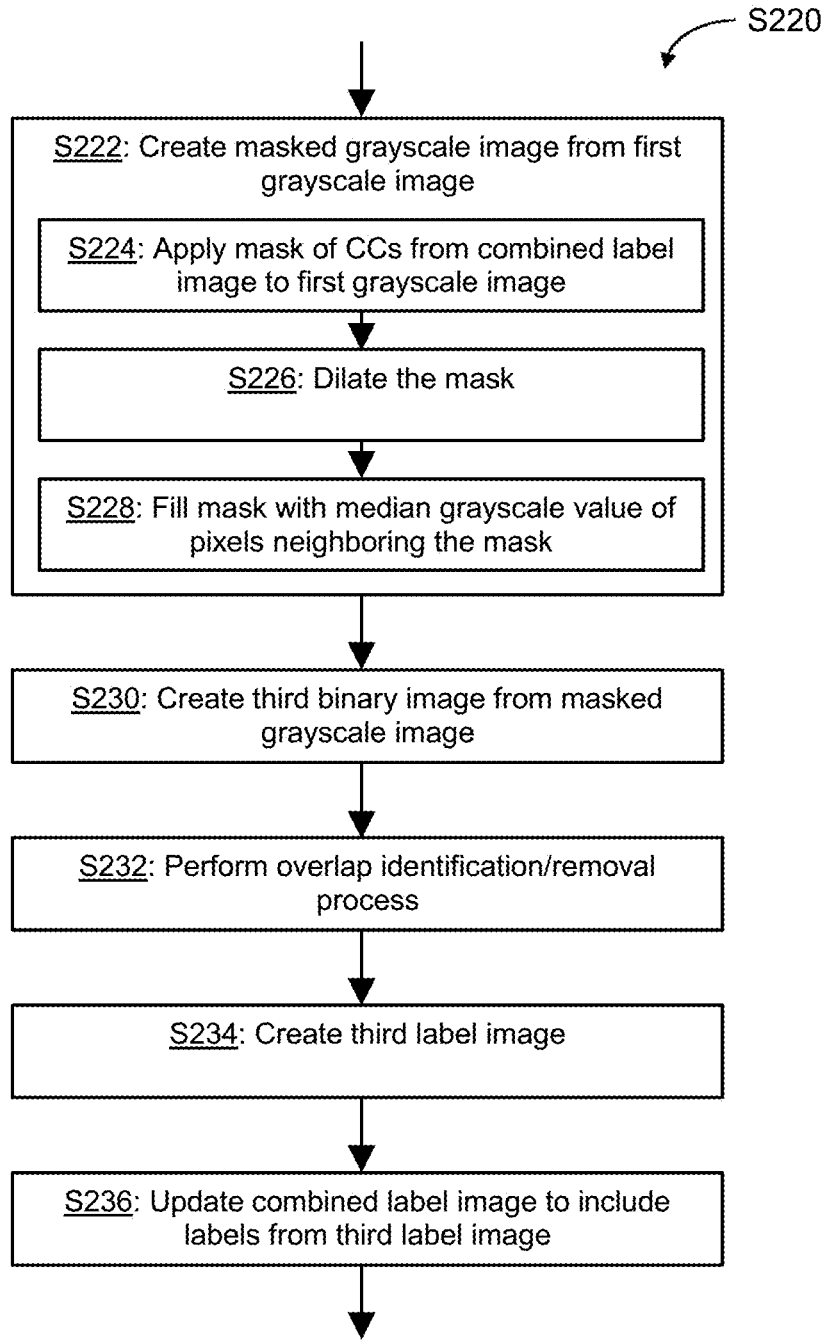
FIG. 20 is a flow diagram showing an example process for using a third binarization in the method of FIG. 1.

In FIG. 20, block S222 creates a masked grayscale image from first grayscale image G1. A masked grayscale image is a copy of G1 that has been modified such that all connected components derived from the first and second binarizations have been subtracted. One example of subtraction is that G1 is modified such that all connected components from first label image L1 and second label image L2 have been replaced with a single grayscale value. Masked grayscale image G3 may be created in various ways.

Figure 21:
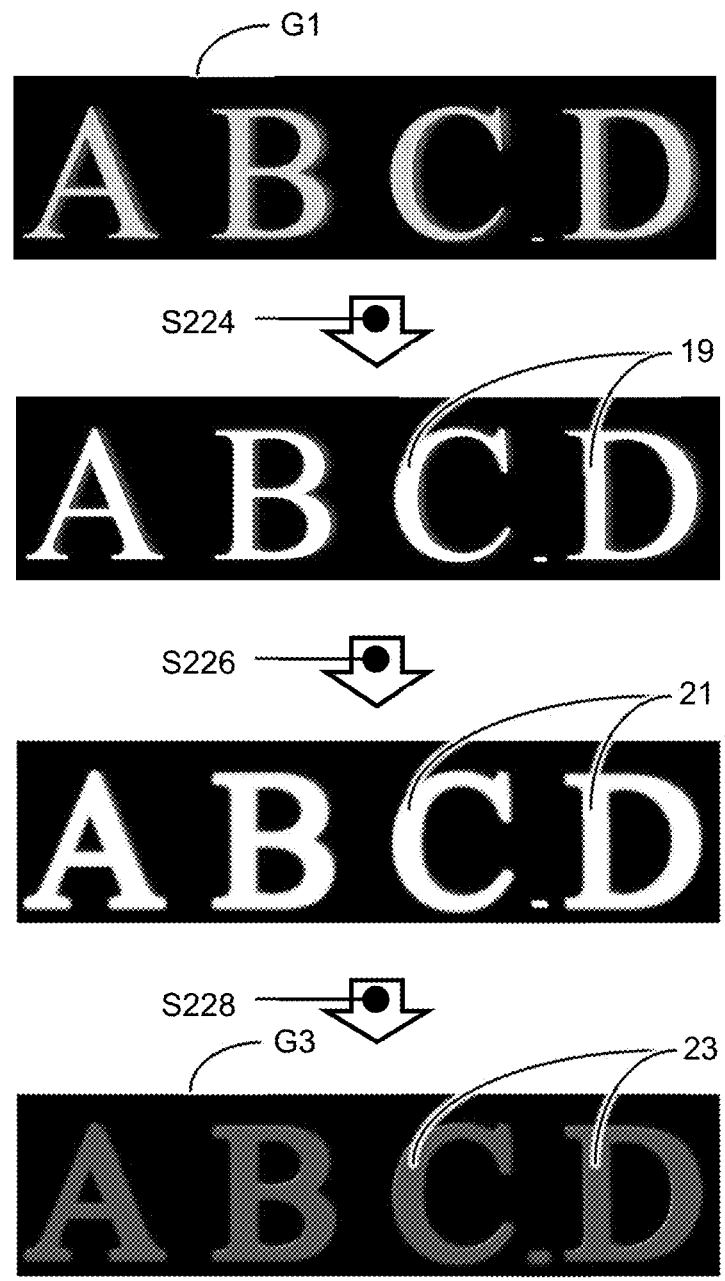
FIG. 21 illustrates an example process for making a masked grayscale image to be subjected to the third binarization.

FIG. 21 illustrates an example process for block S222 starting from first grayscale image G1 of FIG. 2. A mask of connected components from first label image L1 may be applied (block S224) to the G1. Example mask 19 is shown in FIG. 21. Next, mask 19 is dilated (block S226) such that the boundaries of the connected components are enlarged to ensure that the corresponding objects in grayscale image G1 will be completely covered. Next, dilated mask 21 is filled (block S228) such that all pixels of dilated mask 21 have same grayscale value Y. The result is masked grayscale image G3 having filled mask 23 having grayscale value Y. Grayscale value Y can be the median grayscale value of pixels neighboring the mask. The value Y corresponds to dark gray in FIG. 21 for purposes of illustration. When there is a dark background, the value Y may actually be very near the dark background and mask 23 may not be discernable from the dark background. It is also to be understood that instead of the median grayscale value, another grayscale value based on neighboring pixels can be used for Y.

FIG. 21 illustrates subtraction of connected components derived from first label image L1 derived from the first binarization. It is to be understood that G3 results from subtraction of connected components from first label image L1 derived from the first binarization (FIG. 1, block S114) and second label image L2 derived from the second binarization (FIG. 1, block S120). Thus, mask 23 would actually encompass connected components from combined label image LL (first label image L1 combined with second label image L2).

Masked grayscale image G3 could, in some circumstances, provide the benefit of allowing detection of connected components that may have been lost during global binarization of first grayscale image G1. Because previously detected connected components have been replaced with mask 23 having a single grayscale value, the binarization threshold for G3 will likely be different from that for G1.

In FIG. 16 there are high contrast characters 24 and low contrast characters 26. High contrast characters are those that have a large difference between the median grayscale value MGV of the character and the MGV of the surrounding background. For example, the difference can be 50% or more. Low contrast characters are those that have a small difference between the MGV of the character and the MGV of surrounding background. For example, the difference can be below 50%.

Low contrast characters 26 may get lost during global binarization of first grayscale image G1. Due to the presence of high contrast characters 24 and embedded image 22 in first grayscale image G1, global binarization of G1 could result in selection of a binarization threshold that is greater than the grayscale value of low contrast characters 26. Consequently, low contrast characters 26 will be replaced with black background in first binary image B1, so a subsequent connected component labeling process on B1 will not detect low contrast characters 26. Loss of low contrast characters 26 can be avoided by applying a different binarization threshold. By replacing previously detected connected components (high contrast characters and embedded images) with a single grayscale value in third grayscale image G3, low contrast characters 26 in G3 may have greater influence on the global binarization algorithm so that a different binarization threshold is selected. The selected binarization threshold may be better at preserving low contrast characters 26.

Figure 22:
FIG. 22 shows an example masked grayscale image.

FIG. 22 shows example masked grayscale image G3 created from first grayscale image G1 of FIG. 16. In this example, low contrast characters 26 in G1 (FIG. 16) were not detected during the connected component labeling process at block S116 (FIG. 1). High contrast characters 24 and embedded image 22 were previously detected, so their connected components are present in combined label image LL. In masked grayscale image G3 (FIG. 22), the location of mask 23 corresponds to connected components labeled in combined label image LL. Mask 23 covers high contrast characters 24 and embedded image 22. Mask 23 is filled with a single grayscale value, which can be the median grayscale value or other value based the grayscale values of neighboring pixels. Mask 23 may not be discernable in FIG. 22 since mask 23 is filled with a single grayscale value that is near black (the background grayscale value), which can reduce the influence that high contrast characters 24 and embedded image 22 will have in selection of the binarization threshold at block S230 (FIG. 20). In masked grayscale image G3, low contrast characters 26 remain in the same state as in first grayscale image G1 (FIG. 16).

Figure 23:
FIG. 23 shows an example binary image of the masked grayscale image.

Referring again to FIG. 20, at block S230 a third binary image is created from masked grayscale image G3. This is accomplished by applying a global binarization process to masked grayscale image G3. The global binarization process is referred to as a third binarization process to distinguish from the two prior binarization processes a blocks S114 and S120 (FIG. 1). Example third binary image B3 is shown in FIG. 23. The third binarization process at block S230 may be as described for the first binarization process at block S114. The first, second, and third binarization processes are global binarization processes.

In general, block S230 binarizes a copy (G3) of the input image for the first binarization (block S114). The copy has mask 23 based at least on the connected components detected in the first binary image, and the entirety of mask 23 has a single grayscale value.

FIG. 23 shows an example situation in which selection of the binarization threshold at block S230 was greatly influenced by low contrast characters 26 in masked grayscale image G3 (FIG. 22). In this example, the binarization threshold is below the grayscale values of low contrast characters 26 of G3. Consequently, gray pixels for low contrast characters 26 in G3 are assigned white in B3. B3 is the result when mask 23 and other parts of G3 (FIG. 22) are assigned the grayscale value of the background (black) since, in this example, mask 23 and other parts of G3 have grayscale values below the binarization threshold.

Referring again to FIG. 20, block S232 performs an overlap identification/removal process to identify and then remove portions of previously detected connected components that overlap with connected components for third binary image B3. The overlap identification/removal process can be similar to that of block S122 (FIG. 1). In general, block S232 identifies overlaps in the connected components detected in one of the binary images versus the connected components detected in another one of the binary image, and then eliminates any identified overlaps by modifying any of the binary images. For example, the overlap identification/removal process includes performing a connected component labeling process to identify connected components in third binary image B3, comparing pixels of the connected components of B3 to those of B1 and B2 to identify any overlapping pixels, and if any overlapping pixels are identified, then modifying any of B1, B2, and B3 to eliminate the overlap.

Before comparing pixels of B3 to those of B1 and B2 to identify overlaps, connected components of B3 can be analyzed against disqualification criteria to determine whether any of the connected components should be removed from B3. Examples of disqualification criteria include (a) connected component size is below a size lower limit, and (b) connected component local contrast is below a contrast lower limit. The size lower limit can be, for example, 20% of the median size of connected components previously identified from B1. Other size lower limits can be used. The contrast lower limit can be, for example, half of the median local contrast of connected components previously identified from B1. Other contrast lower limits can be used. The local contrast is the difference between the median grayscale value of pixels in G3 corresponding to the connected component and the median grayscale value of neighboring pixels. The median local contrast is the median of the local contrasts of connected components from B1.

In FIG. 20, block S234 performs a connected component labeling process on third binary image B3 to create third label image L3. Third label image L3 lists all remaining connected components of B3. The connected component labeling process determines bounding boxes and areas of the connected components of B3 (FIG. 23). For example, third label image L3 at block S234 will list connected components of B3 (FIG. 23) that define low contrast characters 26 (FIG. 22).

At block S236, labels for connected components from B1, B2, and B3 are combined in combined label image LL. This can be accomplished by revising combined label image LL to reflect any modification of a connected component of B1 or B2 previously performed at block S232 to remove an overlap. Also, labels for connected components of B3 are added to combined label image LL. In the example of FIG. 23, connected components (CCs) in B3 (corresponding to low contrast characters 26 in G3) are added to combined label image LL. Completion of block S236 may mark the end of the subprocess for block S220 (FIG. 1.)

Referring again to FIG. 1, method 10 proceeds from block S220 to block S150 Blocks S150 and onward are performed as previously described. Thereafter, combined label image LL could be transmitted via a network from one apparatus to another.

Figure 24:
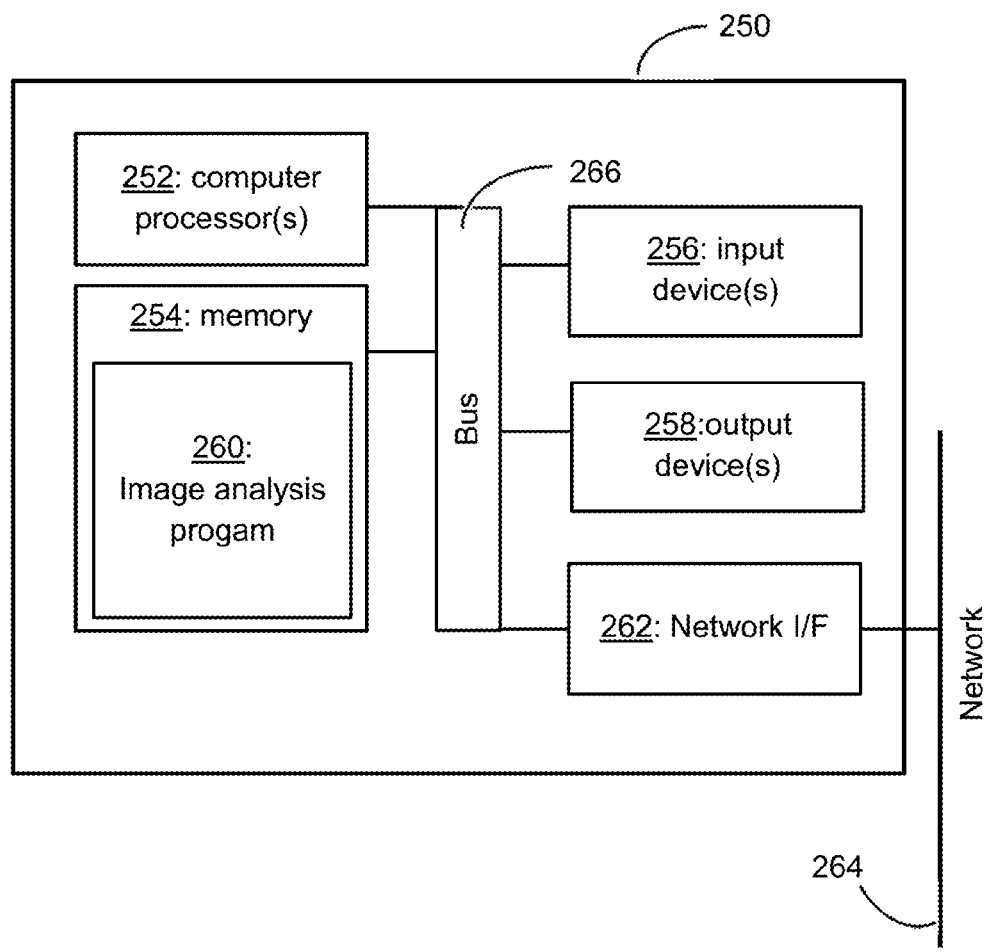
FIG. 24 is a schematic block diagram of an example apparatus configured to perform the processes of the preceding figures.

FIG. 24 shows example apparatus 250 configured to perform method 10 of FIG. 1. Apparatus 250 can be a server, computer workstation, personal computer, laptop computer, tablet, smartphone, facsimile machine, printing machine, multi-functional peripheral (MFP) device that has the functions of a printer and scanner combined, or other type of machine that includes one or more computer processors and memory.

Apparatus 250 includes one or more computer processors 252 (CPUs), one or more computer memory devices 254, one or more input devices 256, and one or more output devices 258. The one or more computer processors 252 are collectively referred to as processor 252. Processor 252 is configured to execute instructions. Processor 252 may include integrated circuits that execute the instructions. The instructions may embody one or more software modules for performing method 10. The one of more software modules are collectively referred to as image analysis program 260.

The one or more computer memory devices 254 are collectively referred to as memory device 254. Memory device 254 includes any one or a combination of random-access memory (RAM) modules, read-only memory (ROM) modules, and other electronic devices. Memory device 254 may include mass storage device such as optical drives, magnetic drives, solid-state flash drives, and other data storage devices. Memory device 254 includes a non-transitory computer readable medium that stores image analysis program 260.

The one or more input devices 256 are collectively referred to as input device 256. Input device 256 can allow a user to enter data and interact with apparatus 250. Input device 256 may include any one or more of a keyboard with buttons, touch-sensitive screen, mouse, electronic pen, and other types of devices. Input device 256 may be used to create an input image for method 10. Input device 256 may include an optical scanner having a camera and light source and which is configured to scan a document page to create an input image used in method 10.

The one or more output devices 258 are collectively referred to as output device 258. Output device 258 may include a liquid crystal display, projector, or other type of visual display device. Output device 258 may be used to display the input image used in method 10. Output device 258 may include an electrostatic printer configured to print the input image on paper.

Apparatus 250 includes network interface (I/F) 262 configured to allow apparatus 250 to communicate with other machines through network 264, such as a local area network (LAN), a wide area network (WAN), the Internet, and telephone communication carriers. Network I/F 262 may include circuitry enabling analog or digital communication through network 264. For example, network I/F 262 may be configured to receive an input image used in method 10. Network I/F 262 may be configured to transmit the result of method 10, such as combined label image LL, to another apparatus.

The above-described components of apparatus 250 are communicatively coupled to each other through communication bus 266.

While several particular forms of the invention have been illustrated and described, it will also be apparent that various modifications can be made without departing from the scope of the invention. It is also contemplated that various combinations or subcombinations of the specific features and aspects of the disclosed embodiments can be combined with or substituted for one another in order to form varying modes of the invention. Accordingly, it is not intended that the invention be limited, except as by the appended claims.

What is claimed is:

1. An image analysis method for creating an image encoded with character information, the method comprising:
   binarizing an input image to create a first binary image;
   detecting a first plurality of connected components in the first binary image;
   inverting the input image to create an inverted image;
   binarizing the inverted image to create a second binary image;
   detecting a second plurality of connected components in the second binary image;
   creating a combined label image including labels for the first plurality of connected components and the second plurality of connected components;
   analyzing the combined label image to arrange, in a family tree, the first plurality of connected components and the second plurality of connected components, the family tree having a first layer classification and a second layer classification, successive generations of the connected components alternate between the first layer classification and the second layer classification;
   selecting a tree layer classification from among the first layer classification and the second layer classification, the selecting performed by a processor based at least on whether one or more of the connected components in the family tree define characters; and
   creating a modified label image by removing, from the combined label image, the labels for the connected components in the selected tree layer classification.

2. The method of claim 1, wherein the analyzing of the combined label image includes:
   identifying parent-child relationships for the connected components of the first plurality of connected components and the second plurality of connected components; and
   assembling the parent-child relationships to arrange the connected components in the family tree such that successive generations of the connected components alternate between the first layer classification and the second layer classification.

3. The method of claim 1, wherein the selecting of the tree layer classification includes determining whether all of the connected components in the family tree define characters, and selecting the second classification when it is determined that all of the connected components in the family tree define characters.

4. The method of claim 1, wherein the selecting of the tree layer classification includes determining whether there is a greater number of the connected components in the second classification that define characters than in the first classification, and selecting the first classification when it is determined that a greater number of the connected components in the second classification define characters than in the first classification.

5. The method of claim 4, wherein the determining of whether there is a greater number of the connected components in the second classification that define characters than in the first classification, includes applying a character criterion to each of the connected components, each of the connected components having a size, at least some of the connected components collectively define a median size, and the character criterion includes comparing the size of the connected component to the median size.

6. The method of claim 1, further comprising:
   binarizing a copy of the input image to create a third binary image, the copy having a mask based at least on the connected components detected in the first binary image; and
   detecting a third plurality of connected components in the third binary image, wherein
   the combined label image includes labels for the first plurality of connected components, the second plurality of connected components, and the third plurality of connected components.

7. The method of claim 6, wherein the mask is filled with a grayscale value based on grayscale values of pixels surrounding the mask.

8. The method of claim 1, further comprising, before the creating of the combined label image:
   identifying overlaps in the connected components detected in one of the binary images versus the connected components detected in another one of the binary images; and
   eliminating the identified overlaps by modifying any of the binary images.

9. An apparatus for creating an image encoded with character information, the apparatus comprising:
   a processor; and
   a memory device in communication with the processor, the memory device storing instructions;
   wherein the processor is configured to create an image encoded with character information by performing a process according to the stored instructions, and the process comprises:
   binarizing an input image to create a first binary image;
   detecting a first plurality of connected components in the first binary image;
   inverting the input image to create an inverted image;
   binarizing the inverted image to create a second binary image;
   detecting a second plurality of connected components in the second binary image;
   creating a combined label image including labels for the first plurality of connected components and the second plurality of connected components;
   analyzing the combined label image to arrange, in a family tree, the first plurality of connected components and the second plurality of connected components, the family tree having a first layer classification and a second layer classification, successive generations of the connected components alternate between the first layer classification and the second layer classification;
   selecting a tree layer classification from among the first layer classification and the second layer classification, the selecting based at least on whether one or more of the connected components in the family tree define characters; and
   creating a modified label image by removing, from the combined label image, the labels for the connected components in the selected tree layer classification.

10. The apparatus of claim 9, wherein the analyzing of the combined label image includes:
    identifying parent-child relationships for the connected components of the first plurality of connected components and the second plurality of connected components; and
    assembling the parent-child relationships to arrange the connected components in the family tree such that successive generations of the connected components alternate between the first layer classification and the second layer classification.

11. The apparatus of claim 9, wherein the selecting of the tree layer classification includes determining whether all of the connected components in the family tree define characters, and selecting the second classification when it is determined that all of the connected components in the family tree define characters.

12. The apparatus of claim 9, wherein the selecting of the tree layer classification includes determining whether there is a greater number of the connected components in the second classification that define characters than in the first classification, and selecting the first classification when it is determined that a greater number of the connected components in the second classification define characters than in the first classification.

13. The apparatus of claim 12, wherein the determining of whether there is a greater number of the connected components in the second classification that define characters than in the first classification, includes applying a character criterion to each of the connected components, each of the connected components having a size, the connected components collectively define a median size, and the character criterion includes comparing the size of the connected component to the median size.

14. The apparatus of claim 9, wherein the process performed by the processor further comprises:
binarizing a copy of the input image to create a third binary image, the copy having a mask based at least on the connected components detected in the first binary image; and
detecting a third plurality of connected components in the third binary image, wherein
the combined label image includes labels for the first plurality of connected components, the second plurality of connected components, and the third plurality of connected components.

15. The apparatus of claim 14, wherein the mask is filled with a grayscale value based on grayscale values of pixels surrounding the mask.

16. The apparatus of claim 9, wherein the process performed by the processor further comprises, before the creating of the combined label image:
identifying overlaps in the connected components detected in one of the binary images versus the connected components detected in another one of the binary images; and
eliminating the identified overlaps by modifying any of the binary images.

17. A non-transitory computer-readable medium having stored thereon computer readable instructions that, when executed by a processor of an apparatus, cause the apparatus to perform a process for creating an image encoded with character information, the process comprising:
binarizing an input image to create a first binary image;
detecting a first plurality of connected components in the first binary image;
inverting the input image to create an inverted image;
binarizing the inverted image to create a second binary image;
detecting a second plurality of connected components in the second binary image;
creating a combined label image including labels for the first plurality of connected components and the second plurality of connected components;
analyzing the combined label image to arrange, in a family tree, the first plurality of connected components and the second plurality of connected components, the family tree having a first layer classification and a second layer classification, successive generations of the connected components alternate between the first layer classification and the second layer classification;
selecting a tree layer classification from among the first layer classification and the second layer classification, the selecting based at least on whether one or more of the connected components in the family tree define characters; and
creating a modified label image by removing, from the combined label image, the labels for the connected components in the selected tree layer classification.

18. The non-transitory computer-readable medium of claim 17, wherein the analyzing of the combined label image includes:
identifying parent-child relationships for the connected components of the first plurality of connected components and the second plurality of connected components; and
assembling the parent-child relationships to arrange the connected components in the family tree such that successive generations of the connected components alternate between the first layer classification and the second layer classification.

19. The non-transitory computer-readable medium claim 17, wherein the selecting of the tree layer classification includes determining whether all of the connected components in the family tree define characters, and selecting the second classification when it is determined that all of the connected components in the family tree define characters.

20. The non-transitory computer-readable medium of claim 17, wherein the selecting of the tree layer classification includes determining whether there is a greater number of the connected components in the second classification that define characters than in the first classification, and selecting the first classification when it is determined that a greater number of the connected components in the second classification define characters than in the first classification.

21. The non-transitory computer-readable medium of claim 20, wherein the determining of whether there is a greater number of the connected components in the second classification that define characters than in the first classification, includes applying a character criterion to each of the connected components, each of the connected components having a size, the connected components collectively define a median size, and the character criterion includes comparing the size of the connected component to the median size.

22. The non-transitory computer-readable medium of claim 17, wherein the process performed by the apparatus further comprises:
binarizing a copy of the input image to create a third binary image, the copy having a mask based at least on the connected components detected in the first binary image; and
detecting a third plurality of connected components in the third binary image, wherein
the combined label image includes labels for the first plurality of connected components, the second plurality of connected components, and the third plurality of connected components.

23. The non-transitory computer-readable medium of claim 22, wherein the mask is filled with a grayscale value based on grayscale values of pixels surrounding the mask.

24. The non-transitory computer-readable medium of claim 17, wherein the process performed by the apparatus further comprises, before the creating of the combined label image:
- identifying overlaps in the connected components detected in one of the binary images versus the connected components detected in another one of the binary images; and
- eliminating the identified overlaps by modifying any of the binary images.

* * * * *